Figure 1:
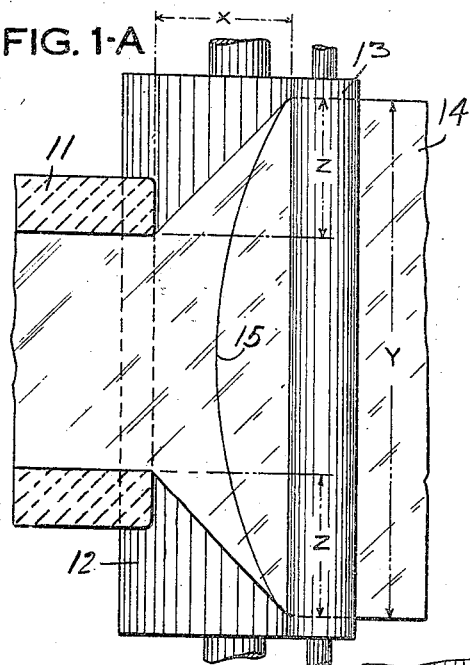
Figure 1:
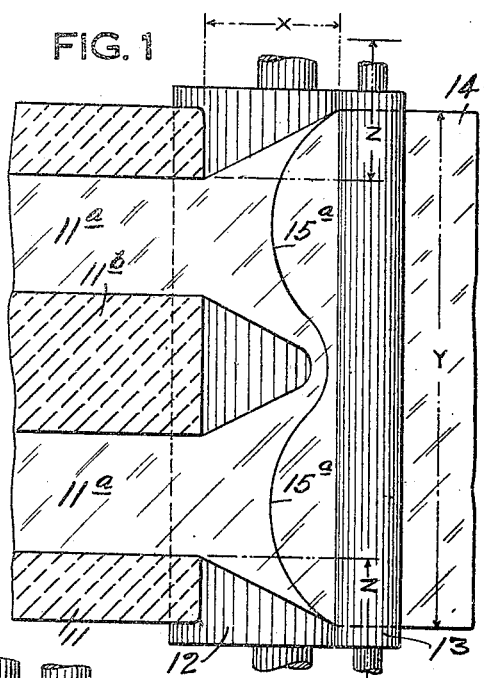

Nov. 2, 1926.

G. E. HOWARD 1,605,736

METHOD OF AND APPARATUS FOR FORMING SHEET GLASS

Filed Feb. 2, 1926      4 Sheets-Sheet 1

FIG. 1-A

INVENTOR
George E. Howard
By Rolson & Brown
Attorney

Nov. 2, 1926.

G. E. HOWARD 1,605,736

METHOD OF AND APPARATUS FOR FORMING SHEET GLASS

Filed Feb. 2, 1926 4 Sheets-Sheet 3

INVENTOR
George E. Howard
By Robson D Brown
Attorney

Nov. 2, 1926.

G. E. HOWARD 1,605,736

METHOD OF AND APPARATUS FOR FORMING SHEET GLASS

Filed Feb. 2, 1926    4 Sheets-Sheet 4

INVENTOR
George E. Howard
By Robson D Brown
Attorney

Patented Nov. 2, 1926.

1,605,736

UNITED STATES PATENT OFFICE.

GEORGE E. HOWARD, OF BUTLER, PENNSYLVANIA, ASSIGNOR TO HARTFORD-EMPIRE COMPANY, OF HARTFORD, CONNECTICUT, A CORPORATION OF DELAWARE.

METHOD OF AND APPARATUS FOR FORMING SHEET GLASS.

Application filed February 2, 1926. Serial No. 85,485.

My invention relates to methods of and apparatus for forming sheet glass, and particularly to the formation of plate glass by rolling the molten glass into sheets and thereafter grinding and polishing said sheets.

Heretofore various attempts have been made to roll plate glass directly from tanks or their forehearths, but it has not been possible to produce plate glass of as good quality as that produced by the pot process, wherein the batch for the glass is melted in a pot and the molten mass then dumped upon a table and rolled into the form of a sheet, which is thereafter ground and polished.

In drawing or flowing a sheet of glass directly from a tank, difficulties are encountered by reason of the fact that the stream cannot be maintained uniform as to volume, nor the temperature thereof controlled within the required limits.

Variation in volume of stream results in overlaps and wave-like formations therein, while difference in temperature as between various portions of the stream of molten glass results in colder particles, thereby causing irregularities. Lack of uniformity in volume and in temperature results in what is known in the art as "ream". Ream is also formed by relative shifting of the particles of molten glass through various other causes. The presence of ream, or lack of homogeneity, in a sheet of glass is very objectionable in that it results in variation in the deflection of the rays of light, and the variation in angle of refraction increases as the homogeneity decreases, with the result that vision through such a sheet of glass is distorted.

One method, by which sheet glass has been formed directly from a tank or forehearth involves the provision of a spout leading from the tank to a point above a bottom forming-roll and adjacent to the breast of a top roll. The glass is passed between the rolls and emerges from the other side in the form of a sheet. In order that the stream of glass from the furnace to the rolls may have sufficient depth to insure against waving or overlapping, as well as to avoid excessive cooling thereof, the spout has to be made relatively narrow. Molten glass to a depth of perhaps three times the thickness of the finished sheet is directed through the spout to the bottom roll and is caused to pile up against the top roll so that it can flow laterally toward each end of the roll, a distance substantially equal to the width of the spout, the width of the spout being about one-third of the length of the roll. While this arrangement to some extent overcomes the objections incident to flowing a thin stream against a pair of sheet-forming rolls, and enables a relatively wide sheet to be formed from the glass that flows through a given spout, imperfections are likely to be caused, by reason of the fact that the glass piled against the top roll becomes chilled, thus interfering somewhat with an even flow toward the ends of the roll, and also resulting in mixture of the colder particles of the glass with the hotter particles thereof, thereby disorganizing the glass particles and causing ream.

One of the objects of my invention is to provide a means and a method whereby glass may be supplied to sheet-forming rolls in the form of streams having considerable depth relative to the thickness of the finished sheet, in such manner that the molten glass is distributed across the face of the sheet-forming rolls with a minimum relative displacement of the glass particles, and wherein there is a minimum variation in decrease of temperature as between various portions of the glass so distributed.

Another object of my invention is to provide a means and a method whereby the sheet-forming rolls may be mounted quite close to the spout, thus permitting the employment of a wider spout than those heretofore used, and avoiding the necessity of distributing the glass to a considerable distance laterally of its line of flow.

Still another object of my invention is to simplify and improve generally the structure and operation of glass working mechanism.

Some of the principal features of the invention to be hereinafter described, reside in the provision of means for dividing a stream of glass into two or more parts and directing the divided streams to the forming roll at points removed from the mid portion thereof, as distinguished from a single stream of glass whose axial line intersects the mid portion of the sheet forming roll.

Another feature resides in the heating of the spout walls and also the surface of the glass, preferably by means of heating members that are heated to incandescence by means of gaseous fuel and the like. This feature not only facilitates the free flow of the molten glass, but also permits the spout to be widened and the sheet forming roll moved closer thereto, thereby requiring less depth to the stream of molten glass and avoiding the problem of wide distribution of glass across the face of the roll.

Figure 2:
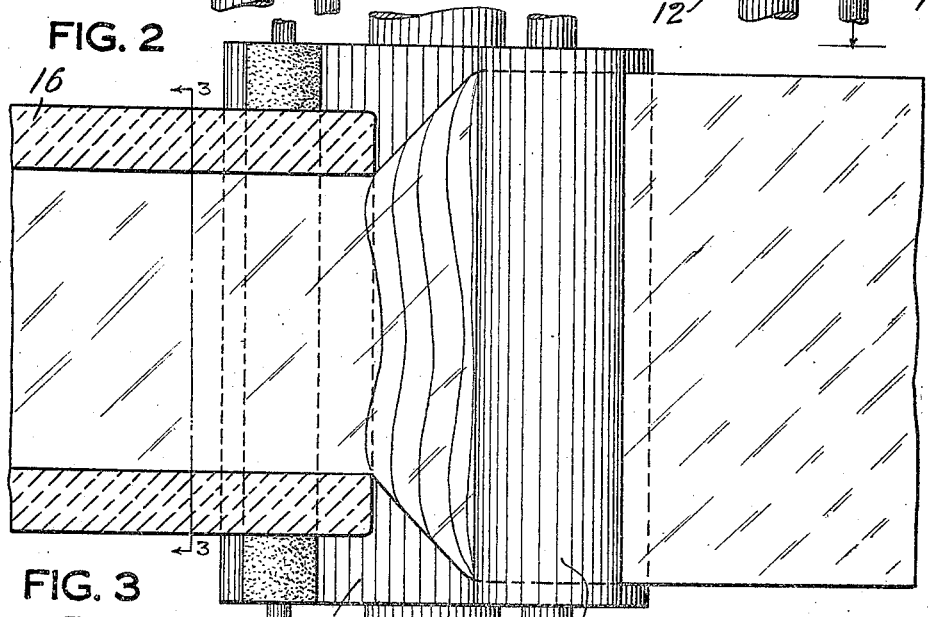
Figure 3:
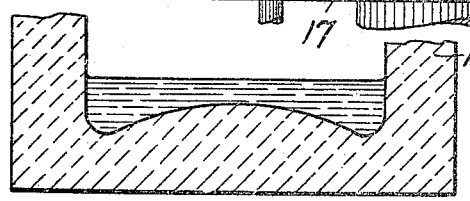
Figure 4:
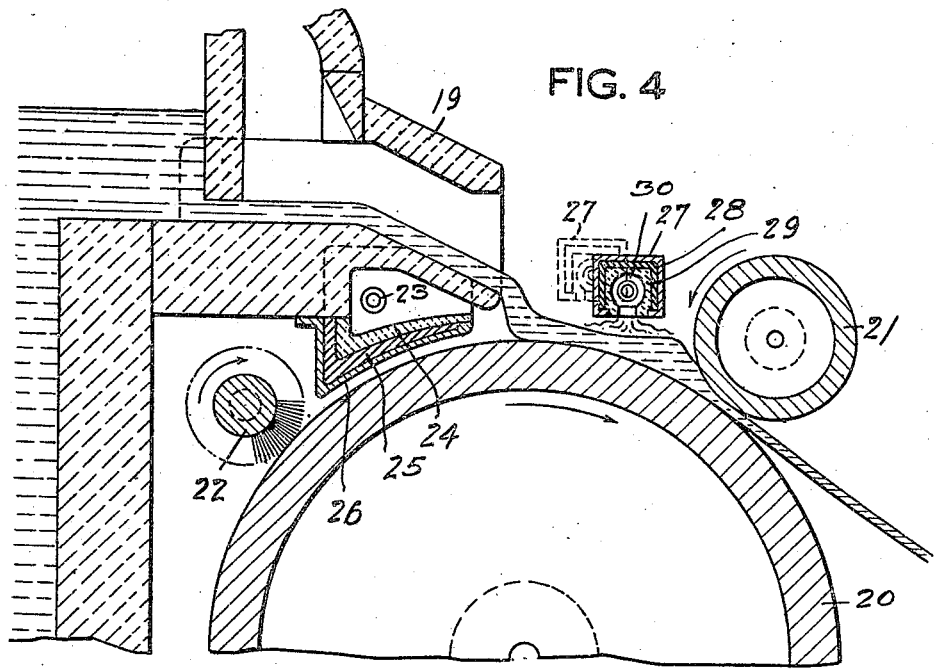
Figure 5:
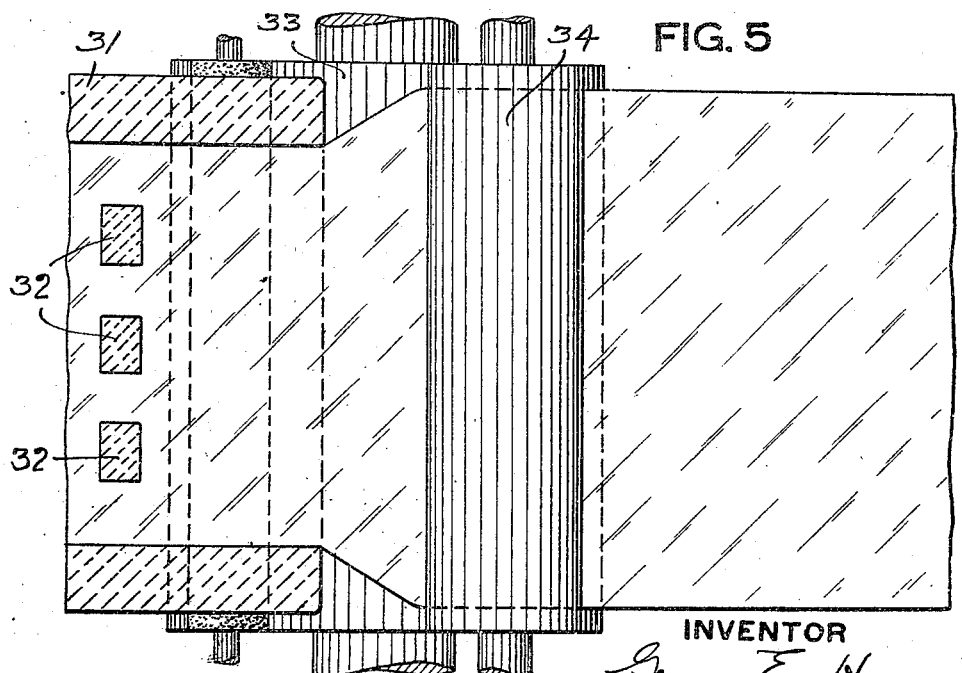
Figure 6:
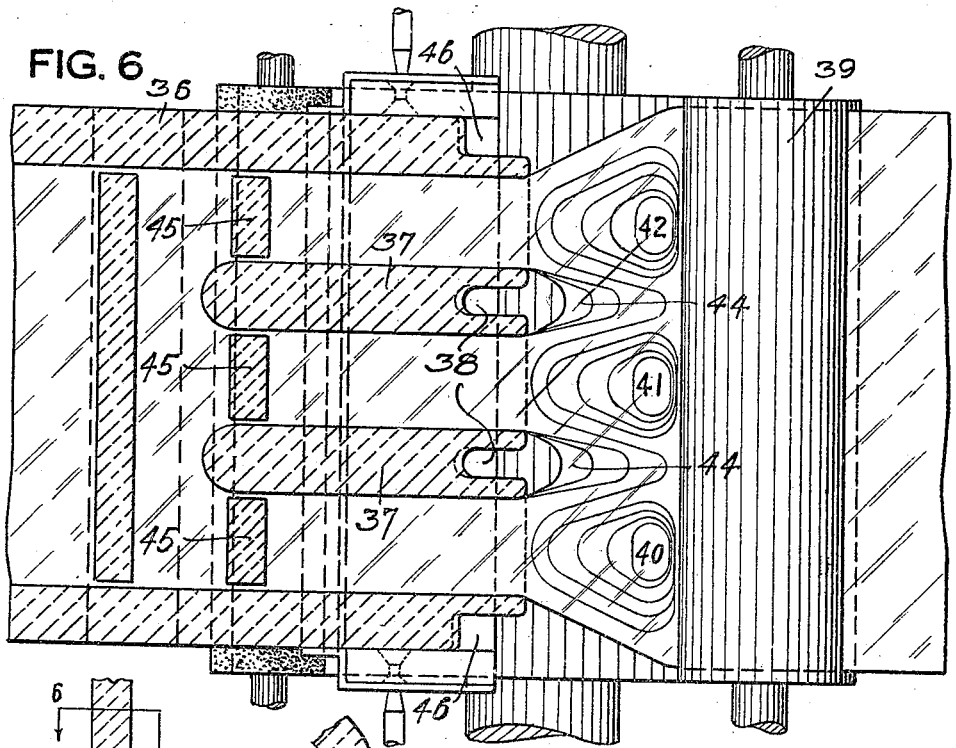
Figure 7:
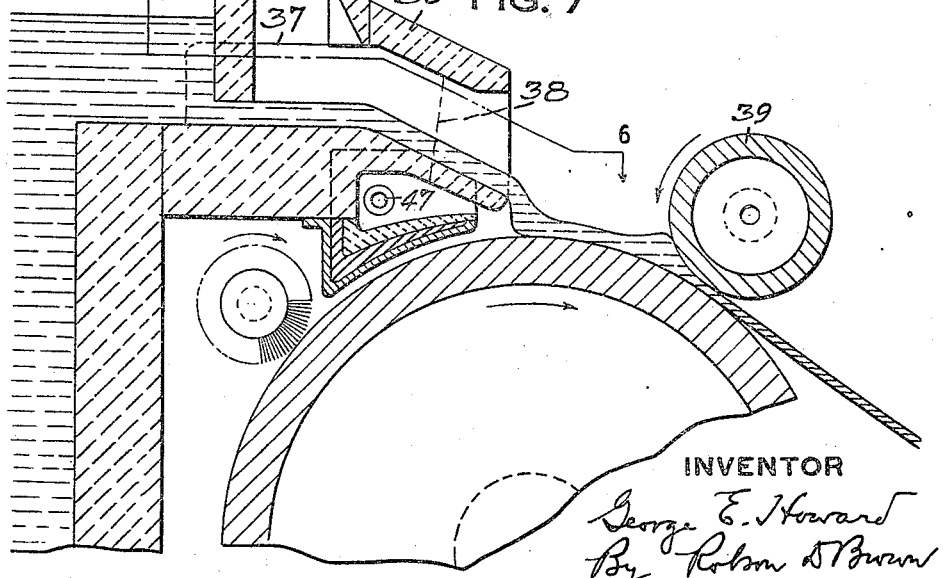
Figure 8:
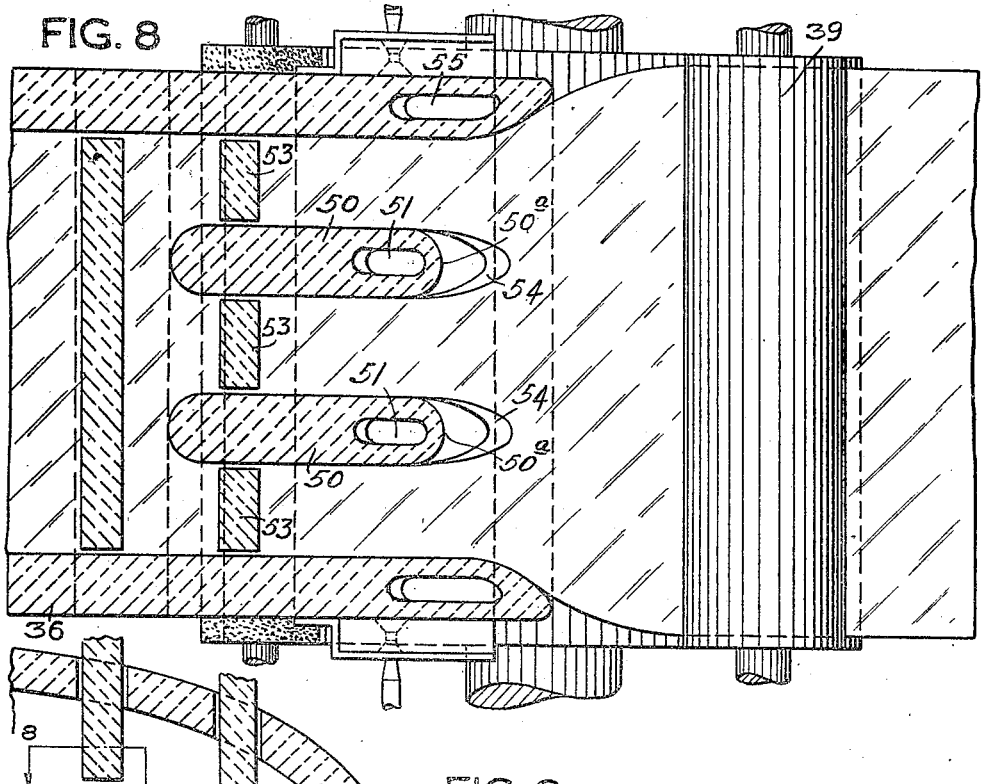
Figure 9:
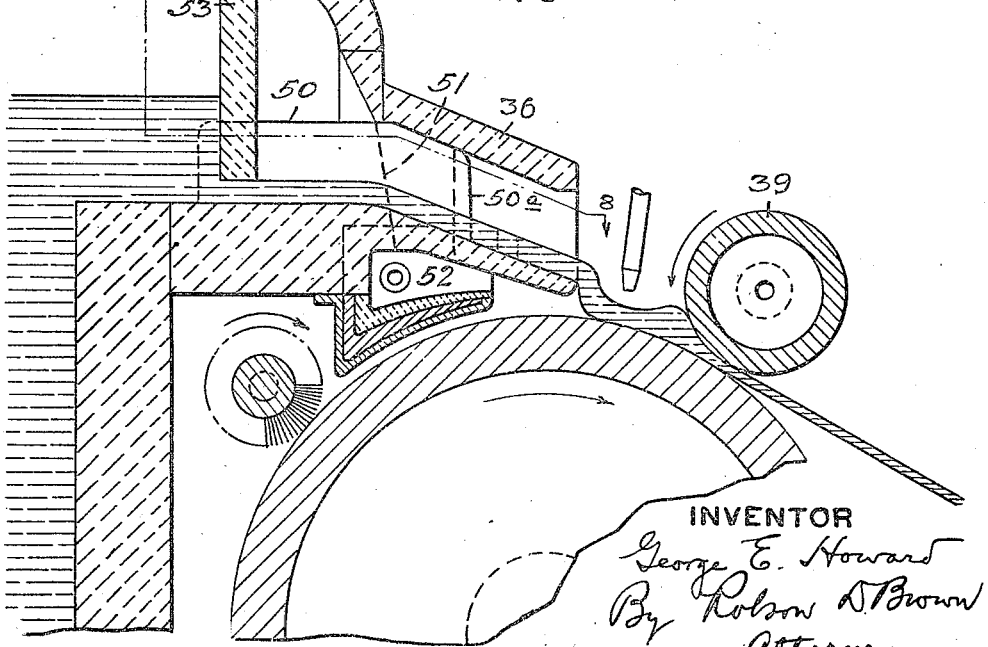

Some of the forms which my invention may take are shown in the accompanying drawing, wherein Fig. 1ª shows a plan view of a spout delivering glass in a single stream against the face of a sheet-forming roll; Fig. 1 is a view showing one manner in which a spout may be divided to form two streams of glass, each of the depth of a normal single stream but having a combined width equal to that of the single stream and directed against the face of a sheet-forming roll; Fig. 2 is a plan view of a modified form of spout whereby volumes of flowing glass of sufficient depth are directed against the face of a sheet-forming roll at points to either side of its mid portion; Fig. 3 is a view taken on the line 3—3 of Fig. 2; Fig. 4 is an elevational sectional view showing one manner in which heat may be supplied to the bottom of a spout and to the surface of the stream of glass; Fig. 5 is a plan view showing one manner in which a relatively wide stream of glass may be controlled in order to produce said results; Fig. 6 is a plan view showing another form of spout and controlling means for the glass passing therethrough; Fig. 7 is a side view of the apparatus of Fig. 6; Fig. 8 is a plan view of a modified form of apparatus somewhat similar to that shown in Fig. 6, and Fig. 9 is a side elevational view of the apparatus of Fig. 8.

In Fig. 1ª I have shown a spout 11 leading from a forehearth or tank extension (not shown). Glass flowing from the spout 11 is deposited upon a bottom roll 12 of relatively large diameter. This roll functions as a table upon which the sheet of glass is rolled by a sheet-forming roll 13, the sheet of glass issuing from between the rolls 12 and 13 in the manner shown at 14, to be thereafter passed through a leer and then ground and polished. The width of the spout 11 is considerably less than the length of the roll 13, thus necessitating the distribution of the stream laterally, along the face of the roll 13 through the distances Z during the time that the glass is moved forward the distance X.

In order to reduce the distances Z I divide the spout 11 into two longitudinal sections 11ª, by means of a partition or dividing wall 11ᵇ, thus providing two streams, each of which is directed against the sheet forming roll 13 at a point intermediate the mid portion thereof and one of its ends, the molten glass being massed against the roll as indicated at 15ª.

It will thus be seen that in order to distribute the glass over the lateral distance Y, it need be massed against the roll only in volumes each substantially one-half of the volume 15 of Fig. 1ª, and need flow laterally only substantially one-half the distance of the mass 15 in Fig. 1ª. It is therefore possible to employ streams of sufficient depth to prevent excessive cooling of the glass and to avoid lapping in the stream.

The rolls 12 and 13 may be cooled and driven in any suitable manner.

Referring now to Figs. 2 and 3, I show a spout 16 that may be of substantially the width of the spout 11 of Fig. 1ª. Glass is flowed from the spout to sheet-forming rolls 17 and 18, that correspond to the rolls 12 and 13 of Fig. 1. However, instead of the spout 16 having a flat bottom, such bottom is curved in cross section, so as to form a stream of glass of relatively great depth at each side of its axial line. This results in causing the deeper portions of the stream of glass to be directed against the sheet-forming roll 18 at points to either side of its mid portion, somewhat in the manner indicated in Fig. 1 at 15ª. While the mid portion of the stream of glass is relatively shallow, the temperature thereof will tend to be maintained by the adjacent deeper portions of the stream. As in the case of Fig. 1, this arrangement reduces the distance which the stream of glass has to travel laterally in order to be distributed across the face of the sheet-forming roll 18.

Referring now to Fig. 4, I show a spout 19, a bottom roll 20, sheet-forming roll 21, and a brush roll 22 for keeping the roll 20 clean. This figure is directed principally to means for heating the bottom wall of the spout 19 to such temperature that the glass passing therethrough will flow freely, and a lubricating effect will be produced upon the molten glass which would otherwise adhere to the bottom of the spout and become chilled. Furthermore, chilling of particles which later become mixed with the hotter particles and cause ream or similar irregularities in the body of the glass is avoided. The base portion of the spout 19 is recessed for the reception of a burner pipe 23 that is partially enclosed by a clay piece 24. Heat insulating material 25 is placed against the clay piece 24 and a metal cover 26 is placed over the insulation 25. The clay or refractory walls of the chamber within which the burner 23 is located are heated to incandescence through combustion of gas that enters through the burner pipe 23 and air supplied therewith, thereby effecting complete combustion and more even distribution of the heat under the spout 19 than would be possible by an arrangement wherein ordinary burners were simply directed against the bottom of the spout.

In order to heat the surface of the glass I provide a burner structure composed of a metal cover 27, heat insulating member 28, a clay piece 29, and a chamber 30 for the combustion of air and gas. The member 29 is provided with openings in its lower side to cause flames from the combustion chamber 30 to strike against the surface of the glass stream. When the clay piece becomes heated to incandescence its walls serve as radiants, to effect complete combustion of the gas and air within the space 30, with the result that heat is uniformly supplied to all portions of the sheet beneath the burner, and there is little variation in the degree of heat so supplied over various periods, such as is present where gas jets are employed. In the case of the gas jets, slightest variation in flow immediately causes a corresponding variation in the amount of heat supplied, whereas where incandescent elements are used there is sufficient heat stored so that fluctuations in gas supply for short intervals is scarcely noticeable, as respects the amount of heat delivered to the glass. This heater tends to maintain the surface of the glass at the proper temperature, to prevent the surface particles from becoming chilled and later mixed with the hotter particles of glass and thereby cause ream. As indicated by dotted lines in Fig. 4, the heater is intended to be adjusted by any suitable means, either vertically, longitudinally, or laterally of the stream of glass, in order to apply the heat at various points to suit conditions.

In Fig. 5, I have shown a spout 31 that may be much wider than the spout 11 of Fig. 1ª and may be heated as by the spout heating apparatus of Fig. 4. However, the features to which attention is particularly directed in connection with this figure are the stream-controlling members 32 and the placing of the rolls 33 and 34 close to the spout.

The rolls 33 and 34 may be placed close to the spout by reason of the fact that the stream is wide enough to render unnecessary wide lateral spread of the stream, and the stream prevented from excessive cooling by the presence of burners beneath the spout.

Another feature which permits the placing of the rolls closer to the spout and hence reducing the length of travel required for the stream of glass, resides in the provision of three blocks or dams which may be immersed to the desired depth and exert considerable resistance to the flow of the glass at different portions transversely of the spout. By this arrangement a wider spout can be employed and the flow of glass therefrom nevertheless controlled in such way that a more even deposit of glass may be made against the sheet-forming roll 34, with a consequently less bulky mass against said roll and less chilling, and also shorter lateral flow required.

The heating of the spout and the location of the rolls close to the spout so that the glass has a relatively short distance to travel may permit glass of low temperature to be supplied from the forehearth, thereby increasing the consistency of the glass to a degree at which it is less likely to lap and wrinkle than if it were hotter and thinner.

The placing of the sheet-forming rolls close to the spout also eliminates the necessity of providing burners over the surface of the glass, as it emerges from the spout, as is the case where the glass has to travel through a relatively great distance in order to reach the rolls and be distributed across the faces thereof.

In Figs. 6 and 7 I show a spout 36 within which are mounted two blocks or islands 37 that are slotted at their forward ends as indicated at 38. These islands serve to divide the stream of molten glass into three streams, so that the molten glass will be massed against the sheet forming roll 39 at points 40—41 and 42, instead of only at the mid portion of the roll. The outline of the stream of moten glass at the forward ends of the islands is indicated by the lines 44.

Dams or vertically movable blocks 45 are disposed between the islands so that flow of glass to the points 40—41 and 42 may be controlled as desired, in order to effect proper distribution of glass along the face of the roll 39.

The side walls of the spout 36 are slotted as indicated at 46. A burner 47 is provided for heating the bottom wall of the spout, as explained in connection with Fig. 4, and a portion of the heat from such burner is directed through the openings 38 and 46, in order to reduce chilling of the glass against the walls 36ª of spout 36 and islands 37, thereby causing the glass to flow more freely and evenly past such walls and avoiding the mixture of chilled particles with the hotter portions of the glass.

Figs. 8 and 9 show a structure that differs principally from the structures of Figs. 6 and 7, in that islands 50 are provided which are of different form than the islands 37. These islands have their forward ends rounded as indicated at 50ª and provided with perforations 51 that communicate, through the bottom wall of the spout, with a heating chamber 52, so that the glass will flow freely and evenly past such islands and not be excessively chilled by contact therewith. Gates or dams 53 control the flow of glass through the various channels formed by the islands 50. Lines 54 indicate the contours which molten glass may assume after it has passed the islands 50. Under some conditions, glass instead of having contours as approximately indicated at 54 may take the contour 50ª. It will be seen that in this arrangement, the heat which passes through openings 55 in the side walls of the orifice and openings 51 in the islands, is not brought into contact with the molten glass, as in the case of Fig. 6.

I claim as my invention:

1. The method which comprises directing a stream of glass toward a relatively wide sheet-forming member, and dividing said stream into a plurality of laterally spaced portions, at a point in advance of its engagement with said member.

2. The method which comprises directing a stream of glass toward a relatively wide sheet-forming member, dividing said stream into a plurality of laterally spaced portions, at a point in advance of its engagment with said member, and controlling the movement of said portions independently of one another.

3. The method which comprises directing a stream of glass toward a sheet-forming roll disposed transversely of the stream, and dividing said stream into a plurality of laterally spaced portions that engage the roll at points to each side of its mid portion.

4. The method which comprises directing a stream of glass past a heated dividing block and toward a sheet-forming member, the said block serving to divide the stream into a plurality of laterally spaced portions.

5. The method of forming sheet glass which comprises directing a plurality of massed volumes of glass against a sheet-forming member at points to each side of the mid portion of said member, the member being disposed transversely of the stream of glass.

6. The method of forming sheet glass which comprises directing a plurality of streams, the combined width of which is substantially less than the total width of the sheet, against a sheet-forming roll at points spaced in a direction transversely to said streams.

7. The method of forming sheet glass which comprises directing a plurality of streams, the combined width of which is substantially less than the total width of the sheet, against a sheet-forming roll at points spaced in a direction transverse to said streams, the said streams each having a depth in excess of the thickness of the sheet to be formed.

8. The method of forming sheet glass, which comprises directing a stream of glass through a spout against a sheet-forming roll mounted adjacent to the discharge end of said spout, and independently regulating the flow of portions of said stream, the width of the spout being not less than one-half of the width of the sheet to be formed.

9. The method of forming sheet glass, which comprises directing a stream of glass through a spout against a sheet-forming roll mounted adjacent to the discharge end of said spout, and heating the surface of the glass as it approaches the roll by first directing a gaseous medium against an incandescent member at a point intermediate the spout and the roll, and thereafter directing said medium into contact with the glass.

10. The method of forming sheet glass, which comprises directing a stream of glass through a spout against a sheet-forming roll mounted adjacent to the discharge end of said spout, and heating the bottom and side walls of the spout, by directing flames previously formed in a combustion chamber beneath the spout through passages in said walls, to facilitate the flow of the glass.

11. The method of forming sheet glass, which comprises directing a stream of glass through a spout against a sheet-forming roll mounted adjacent to the discharge end of said spout, and first heating the bottom wall of the spout to incandescence, to facilitate the flow of glass, and thereafter passing heated gases through passages in the side walls of the spout.

12. Glass working apparatus comprising a spout for a stream of molten glass, a dam in said spout for dividing the stream, and a sheet-forming member mounted in position to receive the divided stream.

13. Glass working apparatus comprising a spout for a stream of molten glass, a dam in said spout for dividing the stream, a sheet-forming member mounted in position to receive the divided stream, and a heater beneath the spout, the dam being vertically perforated to permit the passage of heat.

14. Glass working apparatus comprising a spout for a stream of molten glass, a dam in said spout for dividing the stream, and a sheet-forming member mounted in position to receive the divided stream, the dam being provided with a rounded nose portion.

15. Glass working apparatus comprising a spout for a stream of molten glass, a dam in said spout for dividing the stream, a sheet-forming member mounted in position to receive the divided stream, and a heater beneath the spout, the dam and the side walls being perforated to permit the passage of heat.

16. Glass working apparatus comprising a spout for a stream of molten glass, a dam in said spout for dividing the stream, a sheet-forming member mounted in position to receive the divided stream, a heater beneath the spout, and a gate member disposed to one side of the dam for controlling the flow of glass.

17. The combination with a glass feeding spout and a sheet-forming roll, of an incandescent heater disposed between the spout and the roll for heating the surface of the glass as it approaches the roll.

18. The combination with a glass feeding spout and a sheet-forming roll, of an incandescent heater disposed between the spout and the roll for heating the surface of the glass as it approaches the roll, the said heater comprising a casing open at its lower side and containing refractory elements adapted to be acted upon by a burner flame.

19. The combination with a glass feeding spout and a sheet-forming roll, of a vertically movable dam member for retarding the flow of a portion of the stream of glass, the dam member being of materially less width than the stream.

20. The combination with a glass feeding spout and a sheet-forming roll, of an incandescent heater adjustably mounted between the spout and the roll for heating the surface of the glass as it approaches the roll.

21. The method of forming sheet glass, which comprises directing a stream of glass through a spout against a glass-receiving roll mounted adjacent to the discharge end of the spout, heating the bottom surface of the glass after it leaves the spout, by consuming fuel and directing the flames thereof into contact with the bottom surface of the glass, and permitting escape of a portion of the heat from the space between the roll and the glass, to prevent excessive heating of the roll.

22. The method of forming sheet glass, which comprises directing a stream of glass through a spout against a glass-receiving roll mounted adjacent to the discharge end of said spout, heating the bottom surface of the glass after it leaves the spout, by first directing a gaseous medium against an incandescent member and thereafter directing a portion of said medium into contact with the glass, and permitting escape of another portion thereof from the space between the roll and the glass, to prevent excessive heating of the roll.

23. The combination with an inclined glass feeding spout, of a glass-receiving roll disposed beneath said spout, and a burner chamber disposed beneath the spout and extending longitudinally of the roll, the said chamber being disposed in proximity to the roll and having its bottom wall curved coaxially with the roll.

24. The combination with an inclined glass-feeding spout, of a glass-receiving roll disposed beneath said spout, and a burner chamber disposed beneath the spout and extending longitudinally of the roll, the said chamber being disposed in proximity to the roll and having its bottom wall curved coaxially with the roll and an opening in its front wall.

25. The method which comprises directing a stream of glass past a heated dividing block and toward a sheet-forming member, the said block serving to divide the stream into a plurality of laterally spaced portions, and reuniting said portions previous to contact thereof with the sheet-forming member.

Signed at Butler this 5th day of January, 1926.

GEORGE E. HOWARD.